United States Patent [19]
Bennett

[11] 3,783,375
[45] Jan. 1, 1974

[54] MEANS FOR CALIBRATING A FOUR-PROBE RESISTIVITY MEASURING DEVICE

[75] Inventor: Allan I. Bennett, Export, Pa.

[73] Assignee: Westinghouse Electric Corporation, Pittsburgh, Pa.

[22] Filed: Feb. 21, 1973

[21] Appl. No.: 334,326

[52] U.S. Cl. .............................. 324/64, 324/158 R
[51] Int. Cl. ........................................... G01r 27/14
[58] Field of Search .................... 324/64, 63, 158 P, 324/158 R

[56] References Cited
UNITED STATES PATENTS 2,659,862  11/1953  Branson ............................... 324/64
3,609,537  9/1971  Healy et al. ........................... 324/64

Primary Examiner—Stanley T. Krawczewicz
Attorney—F. Shapoe et al.

[57] ABSTRACT

A means for calibrating a four-probe resistivity measuring device which comprises at least one set of electrical contacts consisting of a pair of inner and outer conductive pads. The conductive pads are collinear, coplanar and equally spaced apart to make electrical contact with each of the four probes. Each pad is insulated from each of the other pads, and each pad of each pair of pads is electrically connected to the other pad of the pair through a resistance equivalent circuit.

6 Claims, 4 Drawing Figures

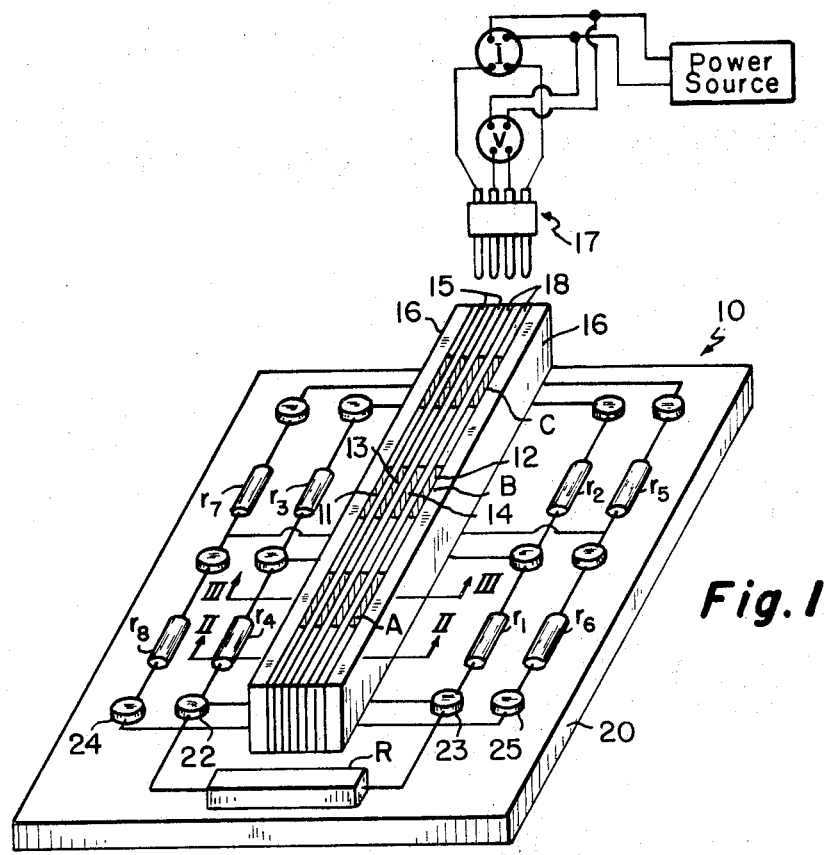
*Fig. 1*
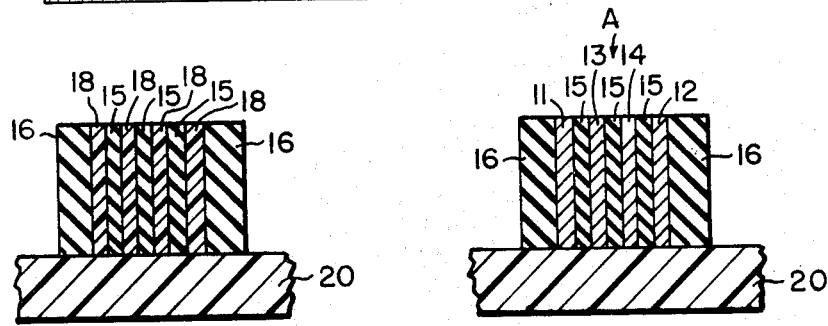
*Fig. 2*   *Fig. 3*
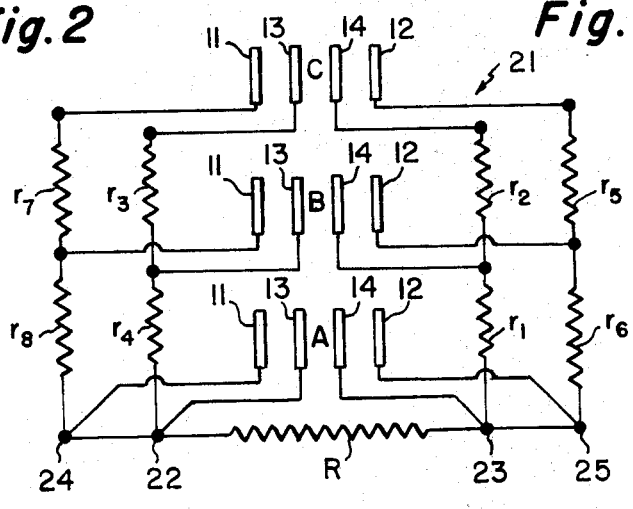
*Fig. 4*

3,783,375

MEANS FOR CALIBRATING A FOUR-PROBE RESISTIVITY MEASURING DEVICE

F FIELD OF THE INVENTION

The present invention relates to an apparatus for electrically calibrating the accuracy of four-point resistivity measuring devices used for measuring the resistivity of semiconductor material and the like.

BACKGROUND OF THE INVENTION

In measuring the electrical resistivity of materials such as semiconductors or other specimens, it is common practice to utilize a device having four collinear, evenly-spaced, spring-loaded probes of which the outer probes are connected to a current source of known current and the inner probes are connected to a voltmeter. In measuring the resistivity, the probes of the device make point contacts with the specimen. The current is permitted to flow between the outer probes, and the voltage or potential gradient produced between the iprobes inner read from the voltmeter. The resistivity of the material is found from the ratio of voltage to current and the spacing between the probes. The probe contacts are, preferably, (of dimensions) small in comparison to the probe spacing which is frequently 0.0625 inches, or, when finer resolution of spatial resistivity variations is required, equal to 0.025 inches.

Electrical errors can arise in the measurement of the resistivity which require the instrument to be calibrated. One of the errors normally encountered is due to the ohmic drop in the two current contact points with the specimens and in the two voltage contact points with the specimens. While the effect of the resistance at these points is minimized, since the voltmeter does not read the ohmic drop in the current points, the IR drop at the voltmeter contact points is measured. This effective resistance is referred to as the "spreading resistance" associated with each probe contact to the specimen for which the resistivity is measured.

This resistance, which is associated with any small area contact, results from the high current density and consequent high voltage gradients associated with the constriction of the current into the small area of the contact. In the measurement of semiconductor material, the spreading resistance is generally about 100 times larger than that of the measured resistance of the specimen, and thus causes inaccuracies in the determination of resistivity. The relative magnitudes of the spreading resistance and the body resistance corresponding to the measured V/I depends upon the ratio of the probe contact area to the probe spacing.

In order to accurately define the geometry of the contact area, it is general practice to keep the probe tips small compared to the spacing between the probes. It has been recommended by the National Bureau of Standards that the measuring apparatus should be able to measure the resistance of the specimen when the ratio of spreading resistance (or resistance at the contact point) to the measured resistance of the specimen is as high as 300.

A ratio of that magnitude causes undetected errors particularly, where, as is frequently the case, a "24 constant current" source furnishes a preset current which is assumed to flow in the absence of instrumental monitoring. Thus, if the open circuit voltage of the current supply is insufficient, undetected errors occur. Also, of appreciable current is found by the voltage measuring circuit, the voltage will be in error by the IR drop caused by this current in the voltage probe "spreading resistances." Moreover, the current source, or ammeter, and voltmeter are devices in which the input terminals are not completely isolated from the power source to which they must be connected for operation. If the current and voltage systems are connected to a common power source, this lack of isolation is equivalent to an electrical conductive connection between one or more of the voltage probes and one or more of the current porbes. In this case, both the measured voltage and the measured amperage will be in error, since not all of the current from the current source flows in the sample, and since the diverted fraction of current will cause additional voltage drops in the voltage probed "spreading resistances."

In order to calibrate four-probe resistive measuring devices, a carefully selected sample of silicon or other material of known resistivity is used as a standard. The utilization of silicon or other material as a sample, having a known resistivity, creates a problem of nonuniformity in that the resistivity of the sample has been itself measured by the four-probe technique and thus calibration is generally a relative rather than an absolute measurement. Moreover, obtaining good reproduceability on such a material is difficult because of the nonhomogenity of the surface, or, when such reproduceability is possible, continuing use causes a progressive surface deterioration and thus a consequential calibration drift. Alternately, it has been suggested that a resistive-equivalent circuit be used as an artificial standard for the calibration of four-probe systems. However, as practiced, the use of the resistive-equivalent circuit as an artificial standard requires that the probes be disconnected from the measuring circuitry and the resistor network connected in their place. Thus, this procedure requires physical disconnection of the probes or at least a wired connection to the network. This is not only inconvenient but provides opportunity for error in connecting the network or re-connecting the probes. More seriously, it does not test the probes themselves for electrical continuity, isolation, and correct wiring.

The present invention overcomes the disadvantages associated with both methods of calibration. The present invention provides a convenient, easy to use means for calibrating a four-probe resistivity measuring device to obtain an absolute and accurate calibration. Moreover, continued use of the calibration means of the present invention, in contrast to silicon or other semiconductor standard samples, does not result in surface degradation. Since there is no wiring or rewiring required by the present invention, no errors arise from making a new or wrong connection.

SUMMARY OF THE INVENTION

The present invention provides a calibration means comprising four conductive surface pads which are equally spaced from each other a distance equal to the probe spacing of a four-probe resistivity measuring device. The conductive pads are insulated from each other and are connected to a network of resistors electrically connected to provide a circuit equivalent to the point contact surface of a specimen to be measured. The electrical equivalent circuit in association with the conductive contact pads provides an analogous "spreading resistance" found in semiconductor material. The circuit includes a resistor of known resistance which is used as the standard for measurement and against which the four-probe device is calibrated.

Calibration is effected by placing the four probes of the device on the four contact pads of the calibration means and measuring the known resistance of the standard resistor. Correct calibration of the four-probe device is effectuated when the measurement results in an equility between the measured V/I and the known value of the standard resistor.

Other advantages of the present invention will be seen from a perusal of the following detailed description taken in connection with the accompanying drawings.

BRIEF DESCRIPTION OF THE DRAWINGS

FIG. 1 is an isometric view of the calibration means of the present invention and a four-probe resistance measuring device;

FIG. 2 is a section taken through plane II—II of FIG. 1;

FIG. 3 is a section taken through plane III—III of FIG. 1; and

FIG. 4 is a schematic diagram of FIG. 1.

PRESENTLY PREFERRED EMBODIMENT

Referring to FIGS. 1 through 4, the calibration means of the present invention comprises at least one set of contact pads. As shown, presently preferred calibration means 10 includes three contact sets: A, B and C. Each set includes four spaced apart conductive pads 11, 12, 13 and 14. Each of the pads are preferably made of silver and equally spaced apart and insulated from each other by an insulating film 15, such as Mylar$^R$. Thus, outer pads 11 and 12 are insulated from inner pads 13 and 14 which are themselves insulated from each other, see FIG. 3. The alternating array of pads and films is held together by a pair of outer insulator plates 16 which can be appropriately bolted or fastened to each other. Insulator plates 16 are preferably made from a meterial such as Micarta$^R$.

Pads 11, 12, 13 and 14 are preferably made from inches. highly conductive material such as silver having a thickness of about 0.020 inches. Insulating films 15 separating the contact pads have a preferable thickness of 0.005 thickness. By utilizing the preferred spacing, the centers of the respective contact pads are approximately 0.025 inches apart and will, thus, accommodate a probe device 17 in which the spacing is 0.025 inches between probes. Moreover, by placing the probes on a 66 ½° diagonal across the surface of the pads, the preferred spacing will accommodate a four-probe device having probes spaced 0.0625 inches from each other. Accordingly, the preferred spacing and pad dimensions accommodate both commonly used four-probe measuring devices.

Where calibration means 10 includes more than one set of pad means, as shown in FIG. 1, each set of pad means is insulated from the other, see FIG. 2, where the resistance values of the respective pads are different. An insulating material such as epoxy resin 18 is placed between the respective sets of pads and is preferably of the same thickness as the contact pads. Furthermore, it is preferred that the entire surface of the array of pads and insulation be machined to a planar smoothness to provide a proper surface for contact by the probes.

The array of pads and insulation is preferably mounted on a base plate 20 which may be a block of polystyrene, or a circuit board. Mounted on the circuit board are reisstors $r_1$ through $r_8$ and resistor R, the calibrated or standard resistor. Each of the resistors is connected to a terminal as shown in the schematic of FIG. 4 to effectuate ease of assembly or change of resistors. Moreover, it is clear that the entire circuit could be miniaturized utilizing printed circuit contact pads and the like. Miniaturization would be particularly appropriate where only one set of pads is contemplated, for example set B and its equivalent circuit as described hereinafter. Preferably, in this case, resistor R would be external to assure high accuracy.

Referring more particularly to FIG. 4, circuit 21 of calibration means 10 comprises a resistor R connected to terminals 22 and 23. Inner pads 13 and 14 of contact set A are electrically connected to terminals 22 and 23. A pair of terminals 24 and 25 are electrically connected to terminals 22 and 23 as well as to outer pads 11 and 12 to complete the equivalent circuit of contact set A.

Inner pads 13 and 14 of contact set B are connected to terminals 22 and 23, respectively, through resistors $r_4$ and $r_1$, respectively. Outer pads 11 and 12 of contact set B are connected to terminals 24 and 25, respectively, through resistors $r_8$ and $r_6$, respectively, to complete the circuit for set B.

Inner pads 13 and 14 of contact set C are connected to terminals 22 and 23, respectively, through resistors $r_3$, $r_4$ and $r_1$, $r_2$, respectively. Outer pads 11 and 12 of contact set C are connected to terminals 24 and 25, respectfully, through resistors $r_7$, $r_8$ and $r_5$, $r_6$, respectively.

In circuit 21, $r_1 - r_8$ each $= r$, where $r = 300R$. Resistor R is preferably a wire wound precision resistor, or custom made manganin or constantan wire where R is less than 1 ohm. Resistors $r_1 - r_8$ are conventional carbon resistors of nominal 10 percent accuracy.

Calibration means 10 is adequate for the calibration of four-probe resistivity measuring devices at only one point in their range. In order to calibrate over the entire operation, it is necessary to utilize several means 10 each with a different R value and a ratio of $r/R = 300$. Alternatively, variable resistors R and r could be used. It is preferred that value, in ohms of R and r be used to provide a calibration over the entire operating range of a four-probe device, for example:

| Unit | R(nominal) | R(measured) | r(nominal) |
|---|---|---|---|
| 1 | 1000 | 1028 | 270,000 |
| 2 | 500 | 511.2 | 150,000 |
| 3 | 100 | 100.5 | 27,000 |
| 4 | 50 | 50.17 | 15,000 |
| 5 | 10 | 11.11 | 2,700 |
| 6 | 2 | 2,59 | 560 |
| 7 | 0.5 | 0.488 | 150 |
| 8 | 0.05 | 0.0461 | 15 |
| 9 | 0.01 | 0.00907 | 2.7 |

While a presently preferred embodiment of the invention has been shown and described in particularity, the invention may be otherwise embodied within the scope of the appended claims.

What is claimed is:

1. A means for calibrating a four-probe resistivity measuring device comprising at least one contact set adapted to make electrical point contact with the probes of said device, each contact set including a pair of inner and outer collinear, coplanar electrically conductive pads equally spaced apart and insulated from each other, and a resistance circuit having at least one first resistor of known resistance, each pad of each pair of pads being electrically connected to said other pad of said pair through said first resistor.

2. A means as set forth in claim 1 wherein said pads are made of silver.

3. A means as set forth in claim 1 wherein each pad of each pair of pads of at least one contact set is electrically connected to said other pad of said pair in series through a second resistor, said first resistor, and a third resistor where said second and third resistors are each equal to about 300 times the resistance of the first resistor.

4. A means as set forth in claim 3 wherein each pad of each pair of pads of at least one contact set is electrically connected to said other pad of said pair in series through a fourth resistor, a second resistor, said first resistor, a third resistor and a fifth resistor where said second, third, fourth and fifth resistors are each equal to about 300 times the resistance of the first resistor.

5. A means for calibrating a four-probe resistivity measuring device comprising a pair of inner and outer collinear, coplanar electrically conductive contact pads equally spaced apart and insulated from each other, and a resistance circuit comprising a first resistor of known resistance, each pad of each pair of pads being electrically connected to said other pad of said pair in series through a second variable resistor, said first resistor and a third variable resistor where said second and third variable resistors are each equal to about $300\,n$ times the resistance of the first resistor and where n is an integer from 0 to 2.

6. A means as set forth in claim 5 wherein said first resistor is a variable resistor.

* * * * *